United States Patent
Reeve et al.

(10) Patent No.: US 11,151,151 B2
(45) Date of Patent: Oct. 19, 2021

(54) INTEGRATION TEMPLATE GENERATION

(71) Applicant: International Business Machines Corporation, Armonk, NY (US)

(72) Inventors: John A. Reeve, Winchester (GB); Trevor C. Dolby, Winchester (GB); Matthew E. Golby-Kirk, Eastleigh (GB); Andrew J. Coleman, Petersfield (GB)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 16/211,695

(22) Filed: Dec. 6, 2018

(65) Prior Publication Data
US 2020/0183947 A1    Jun. 11, 2020

(51) Int. Cl.
*G06F 16/25* (2019.01)
*G06Q 10/06* (2012.01)
(Continued)

(52) U.S. Cl.
CPC ........ *G06F 16/254* (2019.01); *G06F 16/1865* (2019.01); *G06F 16/9035* (2019.01); *G06Q 10/0631* (2013.01)

(58) Field of Classification Search
CPC ............... G06F 16/254; G06F 16/9035; G06F 16/1865; G06Q 10/0631
See application file for complete search history.

(56) References Cited

U.S. PATENT DOCUMENTS

| 6,778,703 B1* | 8/2004 | Zlotnick ............ G06K 9/00449 382/218 |
| 2004/0111711 A1* | 6/2004 | Soroker .................... G06F 8/20 717/136 |

(Continued)

FOREIGN PATENT DOCUMENTS

| CN | 102033748 A | 4/2011 |
| CN | 102542367 A | 7/2012 |
| CN | 105447643 A | 3/2016 |

OTHER PUBLICATIONS

Su et al., "Template extraction from candidate template set generation: a structure and content approach", vol. 2, pp. 211-216 (Year: 2005).*

(Continued)

*Primary Examiner* — Mark D Featherstone
*Assistant Examiner* — Kweku William Halm
(74) *Attorney, Agent, or Firm* — Nicholas D. Bowman; Maxine L. Barasch; Keohane & D'Alessandro, PLLC (57) ABSTRACT

Disclosed embodiments provide improvements in integration template generation. In embodiments, existing customer integration flows already created by users are analyzed using computer-implemented methods, and from these customer integration flows, templates are created that encapsulate the general patterns that are seen in existing customer integration flows. The customer integration flows are anonymized by removing proprietary and/or identifying data. The result is customer integration templates based on actual real-world usage, which can more accurately resemble the needs of customers as compared to traditional templates that are authored by someone envisioning how he thinks the applications will be linked together, but not based on how they actually are used. Disclosed embodiments can generate integration templates based on general patterns encountered (Continued)

by multiple users that serve as a good starting point for any user that wants to do similar integrations.

20 Claims, 10 Drawing Sheets

(51) Int. Cl.
  *G06F 16/9035* (2019.01)
  *G06F 16/18* (2019.01)

(56) References Cited

U.S. PATENT DOCUMENTS

| | | | | |
|---|---|---|---|---|
| 2004/0247168 | A1* | 12/2004 | Pintsov | G06K 9/2054 382/137 |
| 2013/0179394 | A1 | 7/2013 | Simitsis | |
| 2015/0095379 | A1* | 4/2015 | Dickie | G06F 16/22 707/803 |
| 2016/0210224 | A1* | 7/2016 | Cohen | G06F 9/44589 |
| 2016/0350160 | A1* | 12/2016 | Hamway | G06Q 10/06 |
| 2020/0167821 | A1* | 5/2020 | Gorjiara | G06F 16/906 |

OTHER PUBLICATIONS

Adams et al., "Template your boilerplate: using templat haskell for efficient generic programming", Haskell '12: Proceedings of the 2012 Haskell SymposiumSep. 2012, pp. 13-24https://doi.org/10.1145/2364506.2364509 (Year: 2012).*

Yuanqing Guo et al., "Template generation and selection algorithms", The 3rd IEEE International Workshop on System-on-Chip for Real-Time Applications, Jul. 2, 2003, 4 pages.

Ip.com, "System and Method for Template Auto Scaling in Hybrid Cloud", ip.com Disclosure No. IPCOM000247559D, Publication Date Sep. 17, 2016, 6 pages.

Sonia Paeper, "Cloud Integration Template from PowerCenter mapping", Sep. 20, 2017, 2 pages.

* cited by examiner

INTEGRATION TEMPLATE GENERATION

FIELD

The present invention relates generally to computer systems and, more particularly, to integration template generation.

BACKGROUND

Modern enterprise application development utilizes an integration platform that allows developers to connect applications together quickly and easily, enabling them to exchange data. It enables easy integration of existing systems, accommodating a variety of different technologies that the applications use, such as XML, JSON, HTTP, to name a few. Integration flows describe the flow of data between applications, and processing performed on data inputs and outputs. To simplify development, integration templates can be used to provide a starting point for developing an application. As more and more customers are expecting interoperability with multiple applications, integration templates are playing a vital role in application development.

SUMMARY

In one embodiment, there is provided a computer-implemented method for generating integration flow templates, comprising: selecting a group of customer integration flows from a plurality of customer integration flows; normalizing the customer integration flows in the group to create a group of normalized customer integration flows; randomly selecting a normalized customer integration flow from the group of normalized customer integration flows as a base flow; creating a template from the base flow by creating one or more points of variability for fields containing different values between the base flow and one or more customer integration flows from the group of customer integration flows; and sending the template to a template store in response to the template passing a qualification check.

In another embodiment, there is provided an electronic computation device comprising: a processor; a memory coupled to the processor, the memory containing instructions, that when executed by the processor, perform the steps of: selecting a group of customer integration flows from a plurality of customer integration flows; normalizing the customer integration flows in the group to create a group of normalized customer integration flows; randomly selecting a normalized customer integration flow from the group of normalized customer integration flows as a base flow; creating a template from the base flow by creating one or more points of variability for fields containing different values between the base flow and one or more customer integration flows from the group of customer integration flows; and sending the template to a template store in response to the template passing a qualification check.

In yet another embodiment, there is provided a computer program product for an electronic computation device comprising a computer readable storage medium having program instructions embodied therewith, the program instructions executable by a processor to cause the electronic computation device to perform the steps of: selecting a group of customer integration flows from a plurality of customer integration flows; normalizing the customer integration flows in the group to create a group of normalized customer integration flows; randomly selecting a normalized customer integration flow from the group of normalized customer integration flows as a base flow; creating a template from the base flow by creating one or more points of variability for fields containing different values between the base flow and one or more customer integration flows from the group of customer integration flows; and sending the template to a template store in response to the template passing a qualification check.

BRIEF DESCRIPTION OF THE DRAWINGS

Features of the disclosed embodiments will be more readily understood from the following detailed description of the various aspects of the invention taken in conjunction with the accompanying drawings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide improvements in integration template generation. In embodiments, existing customer integration flows already created by users are analyzed using computer-implemented methods, and from these customer integration flows, templates are created that encapsulate the general patterns that are seen in existing customer integration flows. The customer integration flows are anonymized by removing proprietary and/or identifying data. The result is integration templates based on actual real-world usage, which can more accurately resemble the needs of customers as compared to traditional templates that are authored by someone envisioning how he thinks the applications will be linked together, but not based on how they actually are used. Disclosed embodiments can generate integration templates based on general patterns encountered by multiple users that serve as a good starting point for any user that wants to do similar integrations.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

Figure 1:
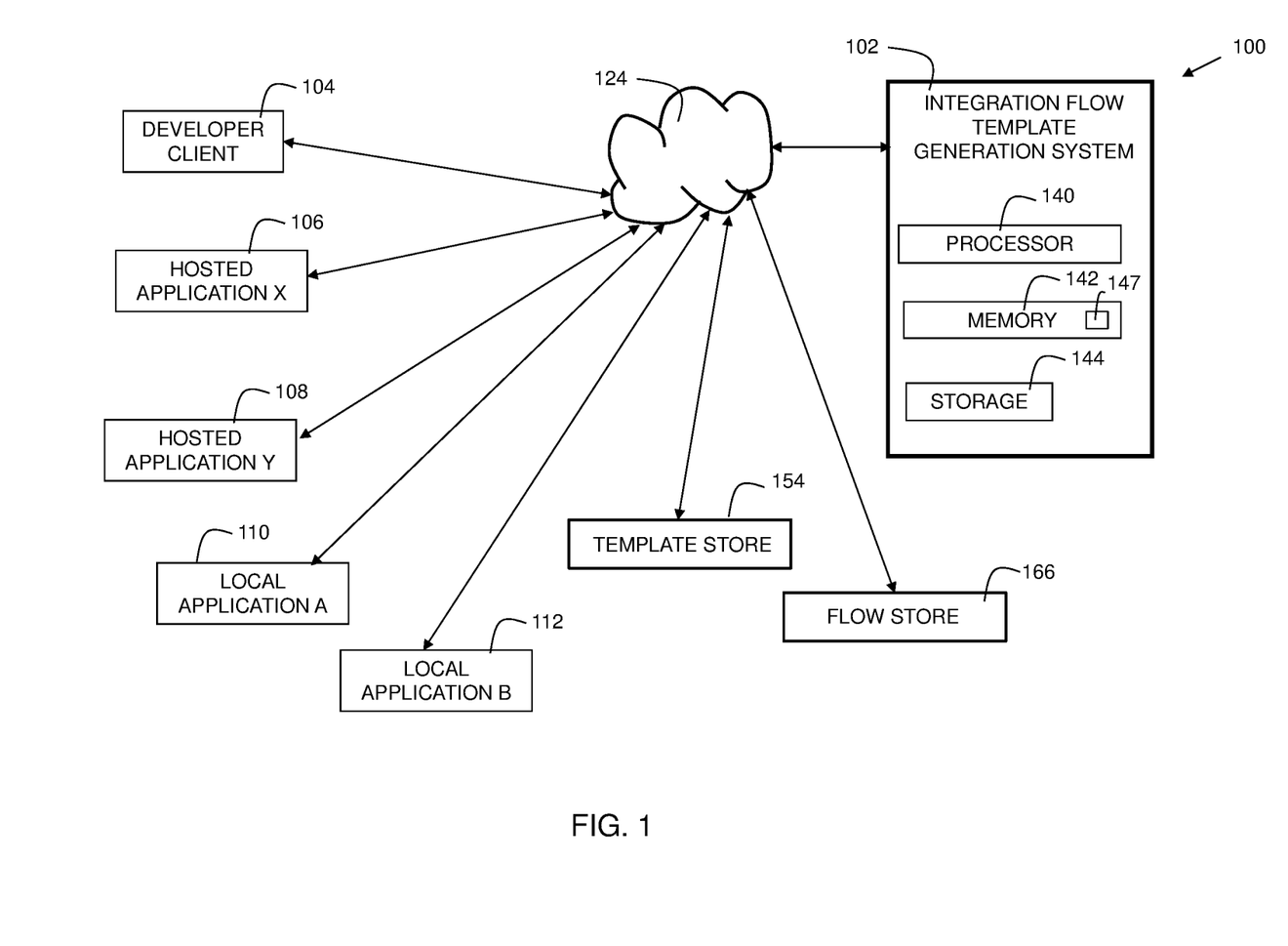
FIG. 1 shows an environment for embodiments of the present invention.

FIG. 1 shows an environment 100 for embodiments of the present invention. Integration flow template generation system 102 has a processor 140, memory 142, and storage 144. Memory 142 has instructions 147 stored thereon that, when executed by the processor, implement elements of embodiments of the invention. System 102 is an electronic computation device. An "integration flow," as used herein, is a description of the flow of data between two or more applications. In some embodiments, the applications are enterprise applications, such as Salesforce or LinkedIn.

System 102 is connected to network 124. The connection may be wireless through Bluetooth®, Wi-Fi, etc., or wired such as through Ethernet®. Network 124 is the Internet, a wide area network, a local area network, or other suitable network.

Developer client 104 is a user computing device (e.g., PC, laptop, etc.) on which an application is installed. The developer can use a software program (which may be implemented as a web-based service) to load a template from the integration flow template generation system 102, and customize it to create the needed integration flow.

Hosted application X 106 and hosted application Y 108 can represent enterprise-level hosted applications. These could be cloud-based applications. These applications are used by many users, and popular in ecommerce, business, electronic communication, etc. Examples of such applications include Salesforce and Insightly.

Local application A 110 and local application B 112 are local applications which may be hosted internally within an enterprise, such as on in-house systems (i.e., the company's own local servers).

Template store 154 stores templates of integration flows. Application developers can use the templates to make operational customer integration flows for deployment. Thus, the term "customer integration flow" in this disclosure refers to an integration flow used by an organization for their specific purposes in interacting between two or more applications.

Flow store 166 stores deployed customer integration flows. These flows may be created by application developers from templates and deployed by customers.

Figure 2:
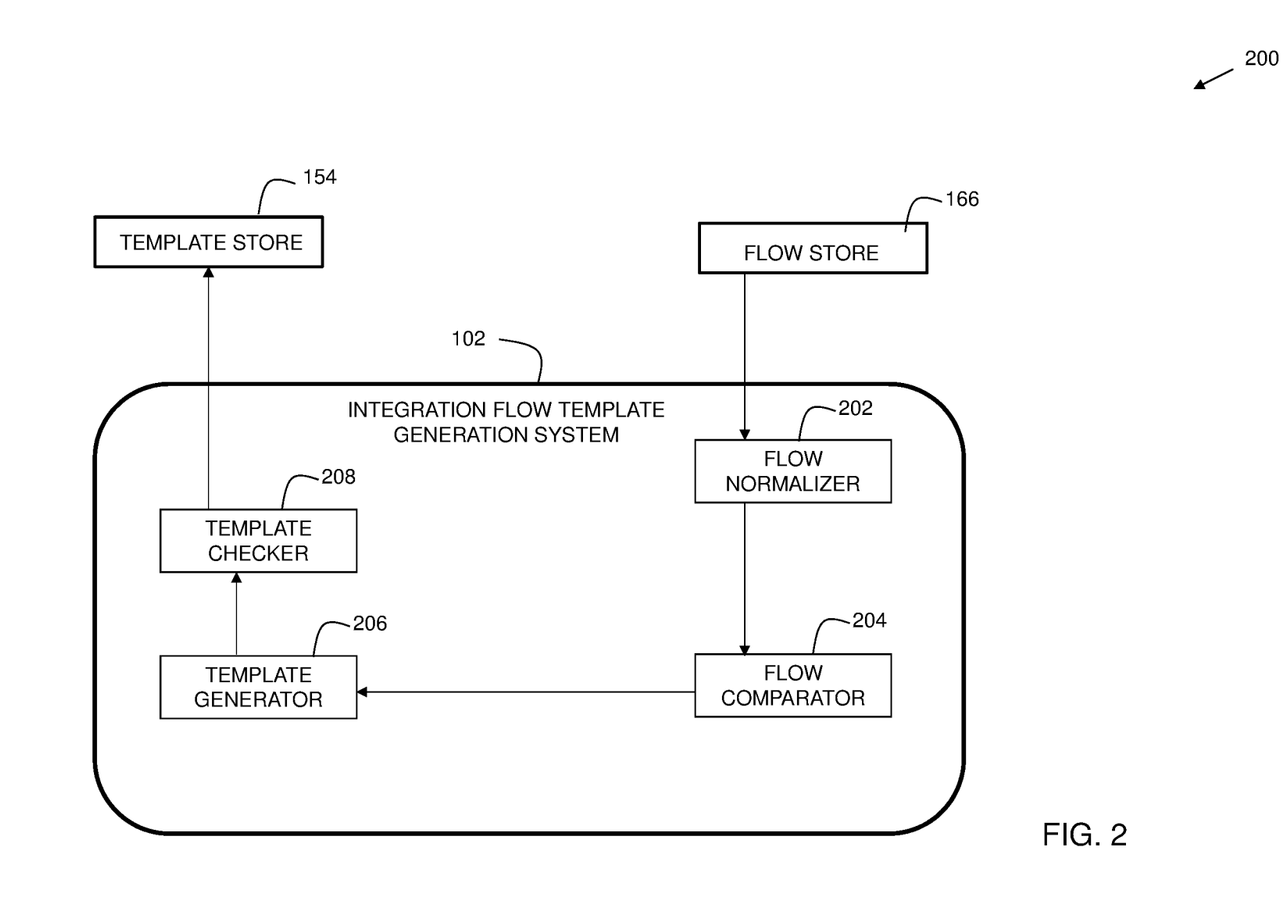
FIG. 2 is a block diagram showing additional details of embodiments of the present invention.

FIG. 2 is a block diagram 200 showing additional details of embodiments of the present invention. Reference 102 represents an integration flow template generation system (also on FIG. 1). Flow store 166 (also on FIG. 1) represents a store of deployed customer integration flows.

Flow normalizer 202 renames and/or reorders the nodes of flows obtained from flow store 166. A node is a functional block that may interact with an application in an input and/or output capacity. For example, a node may receive as input, data from an application such as a CRM application (e.g., Salesforce). Another node may process the data from Salesforce, such as performing filtering based on user-specified criteria. Yet another node may send the data to another application such as a spreadsheet application (e.g., Google Sheets).

Nodes have various properties associated with them, including dependency information. The dependency information includes information about the source of input data. If node A receives input data from node B, then there exists a node dependency. With the dependency, in the integration flow, node B is required to precede node A, since node A needs data from node B in order to perform the node A processing. If, instead, node A does not depend on node B for any input data, then the order of node A and node B within the flow is not constrained.

Embodiments may identify node dependencies, and reorder nodes that are not dependent on each other based on the alphabetical order of the node name, or application that the node interacts with. This reordering process is referred to as normalization. In this case, an original flow that has an order of B☐A may be normalized to A☐B if the changing of the order of the nodes in the flow does not affect the final results of the integration flow between the unnormalized flow and the normalized flow. Nodes can be reordered based on the criterion of node independence. Node independence is the condition where a first node and a second node do not rely on each other for input data. In such a situation, those nodes may be reordered based on name, or other alphanumeric identifier. This reordering can simplify comparison operations. The entirety of customer integration flows may be referred to as a flow pool. In embodiments a group of customer integration flows is selected for use in generating a template. In embodiments, the number of customer integration flows in the group ranges from three to ten. Embodiments can include reordering nodes of each customer integration flow in the group alphabetically by name based on a node independence criterion.

Flow normalizer 202 normalizes a plurality of customer integration flows to create a plurality of normalized customer integration flows. Normalizing the flows prior to inputting them to the flow comparator 204 can provide increased efficiency as it reduces the time needed for the comparison operation.

In some embodiments, normalizing the plurality of customer integration flows comprises reordering nodes of each customer integration flow alphabetically by name. Nodes that have an input data dependency on an upstream node are not reordered such that they precede that upstream node. Nodes that do not have a node dependency on input data may be re-ordered alphabetically based on node name, or other alphanumeric identifier.

Flow comparator 204 compares flows for similarity. A normalized customer integration flow is randomly selected from a group of the plurality of normalized customer integration flows as a base flow. The group is a subset of the plurality of customer integration flows formed based on the same starting node, or other suitable criteria. A similarity score is computed for the base flow. The similarity score is a measure of similarity of the base flow to each flow of the plurality of normalized customer integration flows.

In embodiments, the base flow is compared to all the flows in the group. A group is created that contains all the flows that are below a predetermined similarity score (e.g., a similarity score less than or equal to five). This group of flows is then used to create points of variability within the base flow to form a template. If there are not enough flows (less than a predetermined threshold) that are similar to the base flow, then that base flow is rejected and removed from the group, and a new base flow is randomly chosen. In embodiments, this process is repeated until a satisfactory base flow is found or the group is exhausted.

In some embodiments, the similarity score is computed by adding a point for each node that differs between two flows. A score of zero indicates an identical flow, and points are added for each difference. A lower score, therefore, indicates a higher degree of similarity.

In some embodiments, an overall similarity score for the group may be performed by averaging the similarity scores of each flow in the group. A lower score indicates a higher level of similarity. A score of zero indicates an identical integration flow. By using the normalization process of disclosed embodiments, flows that produce an identical normalized result are deemed equivalent, even if the originally authored flows that created the normalized flows had a different order.

Template generator 206 generates a template if the computed similarity score for a base flow is within a predetermined threshold. This module creates points of variability by examining differing fields in properties of nodes within the flow. A point of variability or a "variability point" is a user-defined value (e.g., data entered by the user to customize the flow). Example points of variability can include network information such as IP address, port number, and domain, etc.

Template checker 208 checks various criteria including group size, points of variability, and whether a previously generated similar template exists. The group preferably is sufficiently large in size to preserve anonymity. In some embodiments, this may be at least three flows, at least five flows, or between three and ten flows, or other suitable size. In embodiments, the template checker 208 may specify a number of unique users or unique customers for the group. In embodiments, the predetermined threshold for the number of unique customers may range from 3 to 10. Including integration flows originating from multiple customers helps to anonymize the generated template. In embodiments, if the number of unique users is below the predetermined threshold, then no template is generated.

Template checker 208 checks the amount of points of variability in the template. If the number of points of variability exceeds a predetermined threshold, or is outside of a predetermined range, the checker 208 collapses them to simplify the template. Too many points of variability can make the template complex, and therefore, the time savings it offers is diminished. In some embodiments, the predetermined range of points of variability is between one and three.

Template checker 208 also checks whether a previously-generated template similar to the current template already exists in the template store. If a similar one already exists, the current template is discarded, and the developer/user is provided with the similar previously-generated template. If a similar previously-generated template does not exist, then the process proceeds with the current template.

The generated template is sent as a template to a template store 154 (also FIG. 1) in response to the similarity score being within a predetermined threshold, following the template checker confirming that the checks resolve properly.

In embodiments, once the template is generated, all the integration flows used in making the template are removed from the group, and the process repeated again. This is because there can be many different templates that can be generated from the same group. All the flows that were not used in making the first template are still valid flows that might be able to make another different template when analyzed together. For example, within a group of flows that integrates with Salesforce and Insightly, there might be 100 different customer integration flows. Disclosed embodiments obtain a smallest set as possible of templates that best covers the different use cases represented by those 100 different customer integration flows.

Figure 3:
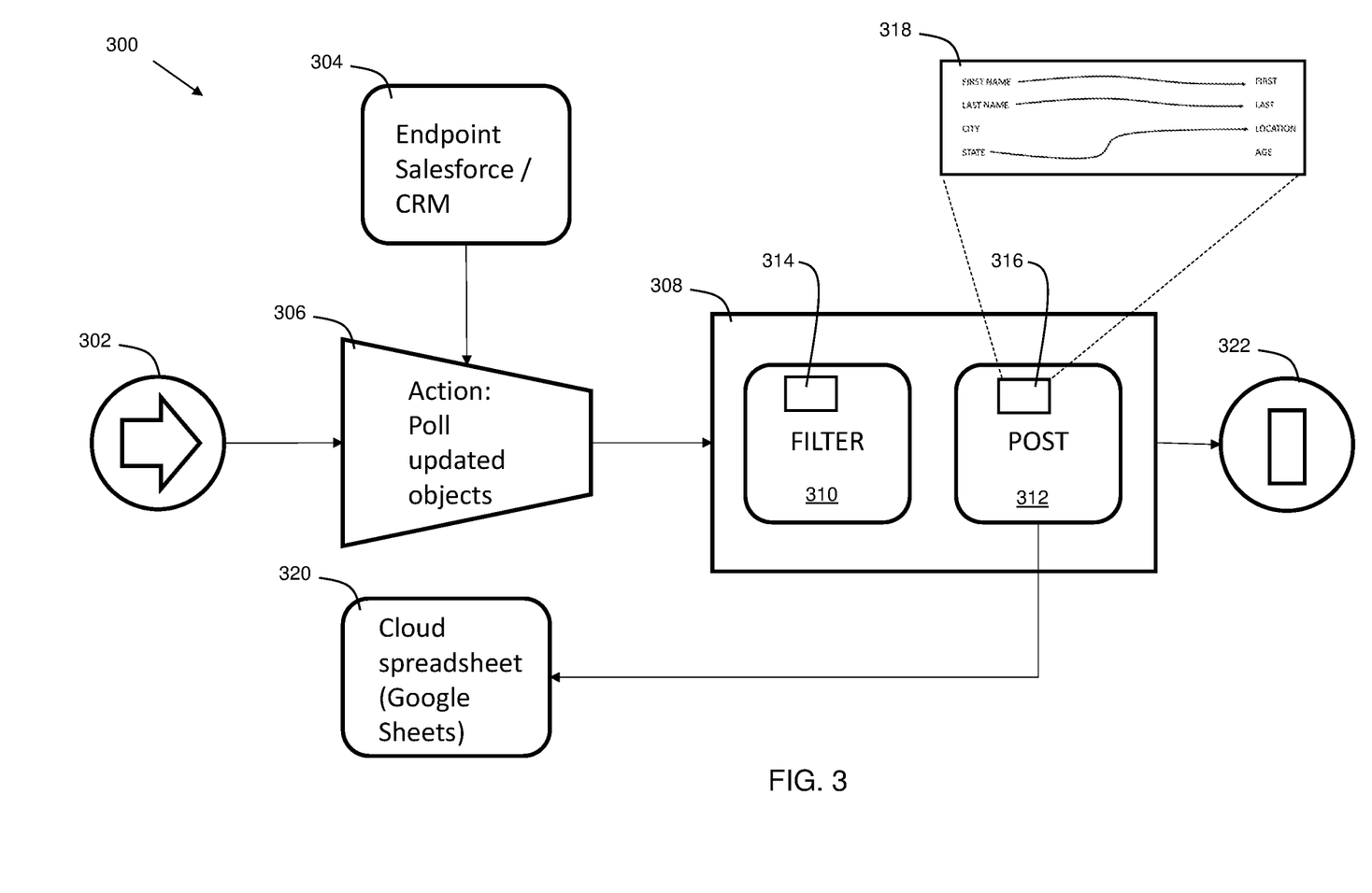
FIG. 3 shows an exemplary flow editor rendering.

FIG. 3 shows an exemplary flow editor rendering 300. Non-limiting examples of such flow editor programs can include: IBM App Connect, Mulesoft, Microsoft flow, and IBM Integration Bus on Cloud. At 302, a start icon is shown. At 322 a termination icon is shown. The processing in the flow occurs between the start icon 302 and the termination icon 322. The icon at 304 represents a source endpoint (for example, a customer relationship management (CRM) system such as Salesforce), which leads to the action block at 306. At 306, updated objects are polled. A change in specified objects from the source triggers processing at process block 308. Process block 308 can contain logic. As an example, for each object matching certain criteria, perform certain processing. Examples can include an if/then clause as a trigger for a status change. For example, the logic can be if the status equals new, then load it into the sheet.

At 310, there is a filter block. This filters data on various criteria 314. In practice, a user selects criteria 314 to get details of filter criteria to edit/select. At 312, post block contains logic of where to send the filtered data and how the data is mapped between the two applications. At 316, there is mapping criteria which contains information on how to map the data between the two applications. In practice, a user clicks on 316 to access fields in 318 (also shown in FIG. 4). Fields 318 allow the user to view and map data in the flow. At 320, there is a destination endpoint (in the example, a cloud-based spreadsheet application such as Google Sheets). This flow is exemplary, to illustrate an example of an integration flow. Other more complex integration flows are possible, and may be used in various templates, within the scope of the invention.

Figure 4:
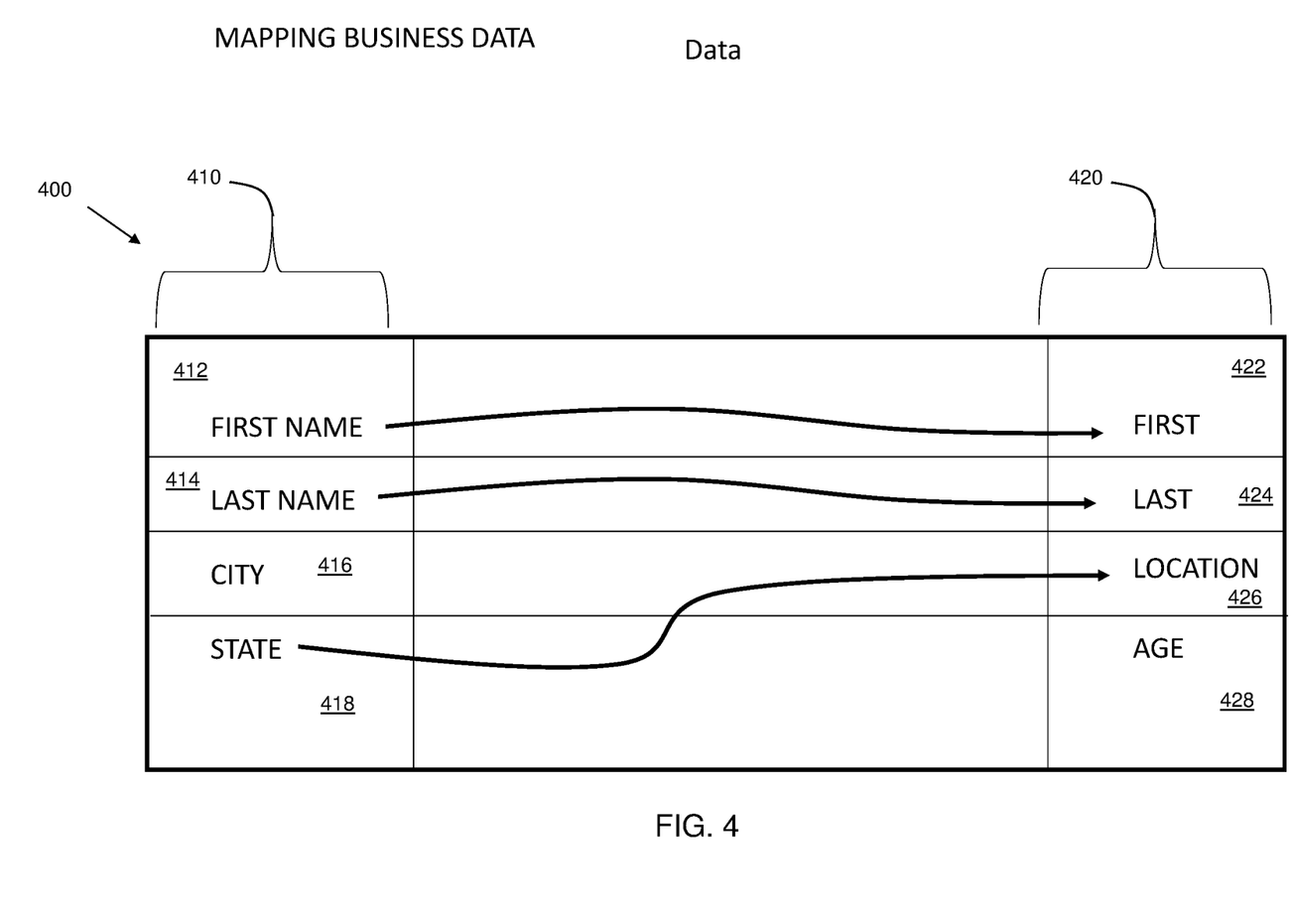
FIG. 4 shows an exemplary data mapping.

FIG. 4 shows an exemplary data mapping 400. Column 410 represents a source application (e.g., Salesforce). Column 420 represents a destination application (e.g., Google Sheets). Column 410 includes fields 412-418 in the source application. Column 420 includes fields 422-428 in the destination application. Some mappings of data may be automatic based on fields having similar titles/names (e.g., field 412 for "First Name" in Salesforce maps to field 422 for "First" in Google Sheets and field 414 for "Last Name" in Salesforce maps to field 424 for "Last" in Google Sheets).

Some fields may not map in a direct manner, so the user must then specify the mapping. The data mapping 400 is shown on a user interface screen. In some embodiments, the screen may be touch-sensitive. The user/developer may specify the mapping by drawing arrows using a finger, stylus, or mouse, etc. This is shown in field 418, titled "State," being mapped to field 426, titled "Location."

All fields are not required to be used in the mapping. Some source fields may not be used, such as field 416 for "City." Some destination fields may not be used, such as field 428 for "Age." In embodiments, these mappings may be saved and included as part of the generated integration template.

Figure 5:
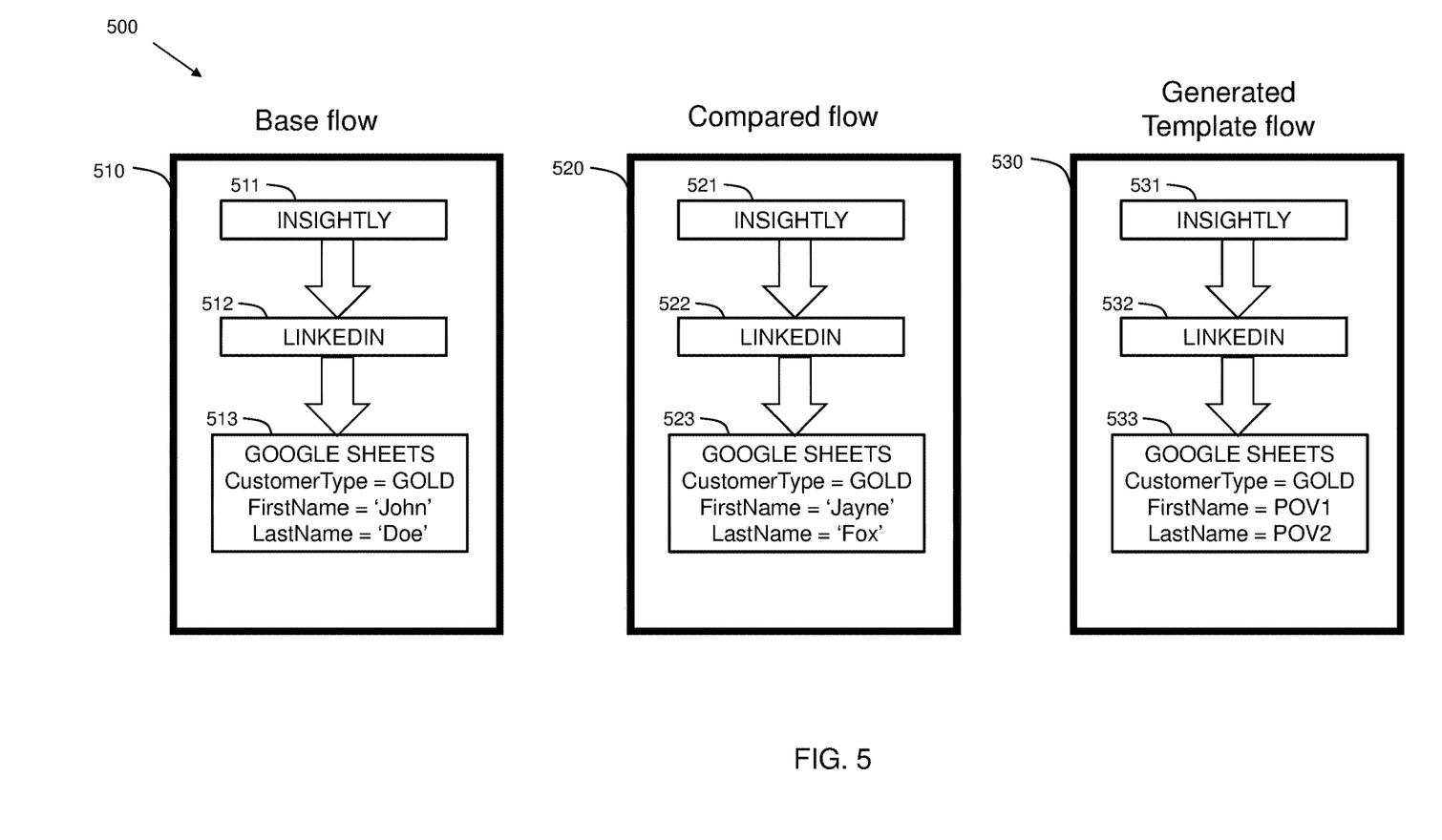
FIG. 5 shows an example of point of variability creation.

FIG. 5 shows an example 500 of point of variability creation. Flow 510 represents a base flow having three nodes. A first node 511 represents an object that obtains data from Insightly. A second node 512 represents an object that obtains data from LinkedIn. A third node 513 represents an object that outputs data from Insightly and LinkedIn into Google Sheets. Node 513 includes three properties: a customer type, a first name, and a last name. Flow 520 represents an integration flow that is compared with base flow 510. A first node 521 represents an object that obtains data from Insightly. A second node 522 represents an object that obtains data from LinkedIn. A third node 523 represents an object that outputs data from Insightly and LinkedIn into Google Sheets. Thus, the normalized node order is identical. However, some of the properties within the third node differ between flow 510 and flow 520. The property "CustomerType" is the same for both the base flow 510 and the compared flow 520, and thus, in the generated template flow 530, the third node 533 maintains the CustomerType setting of "Gold." Since disclosed embodiments use a group of integration flows from various customers, and each has set the value of the CustomerType field to "Gold," then no information that is unique to a specific customer is identified.

For fields that differ between flows, such as FirstName and LastName, they are genericized into points of variability. In the example, node 513 has a FirstName value of "John" and node 523 has a FirstName value of "Jayne." Because the field values differ between flow 510 and flow 520, the generated template flow 530 uses a variable field indicated as POV1 for FirstName in node 533. Similarly, node 513 has a LastName value of "Doe" and node 523 has a LastName value of "Fox." Because the field values differ between flow 510 and flow 520, the generated template flow 530 uses a variable field indicated as POV2 for LastName in node 533. When using the template flow 530, a user puts his/her own data in fields indicated with a "POV" (Point of Variability) designation. In the template flow 530, node 531 and node 532 are similar to node 511 and node 512 from the base flow, since in the example, they are identical to that in the compared flow 520. This example is intentionally simplified. However, in practice, most of the nodes in a flow may have some points of variability in them based on differing fields values amongst the base flow and the various compared integration flows.

Thus, embodiments include inserting point of variability designators in fields that have differing values amongst compared integration flows. In embodiments, a template is created from the base flow by creating one or more points of variability for fields containing different values between the base flow and one or more customer integration flows from the group of customer integration flows. Preferably there are some fields that have common values amongst all the flows. Those fields have the common values used as default values for the template. Values that differ (e.g., IP addresses, names, etc.) are converted to a point of variability in the template. The points of variability are values that the user of the template fills in to complete his/her integration flow.

Figure 6:
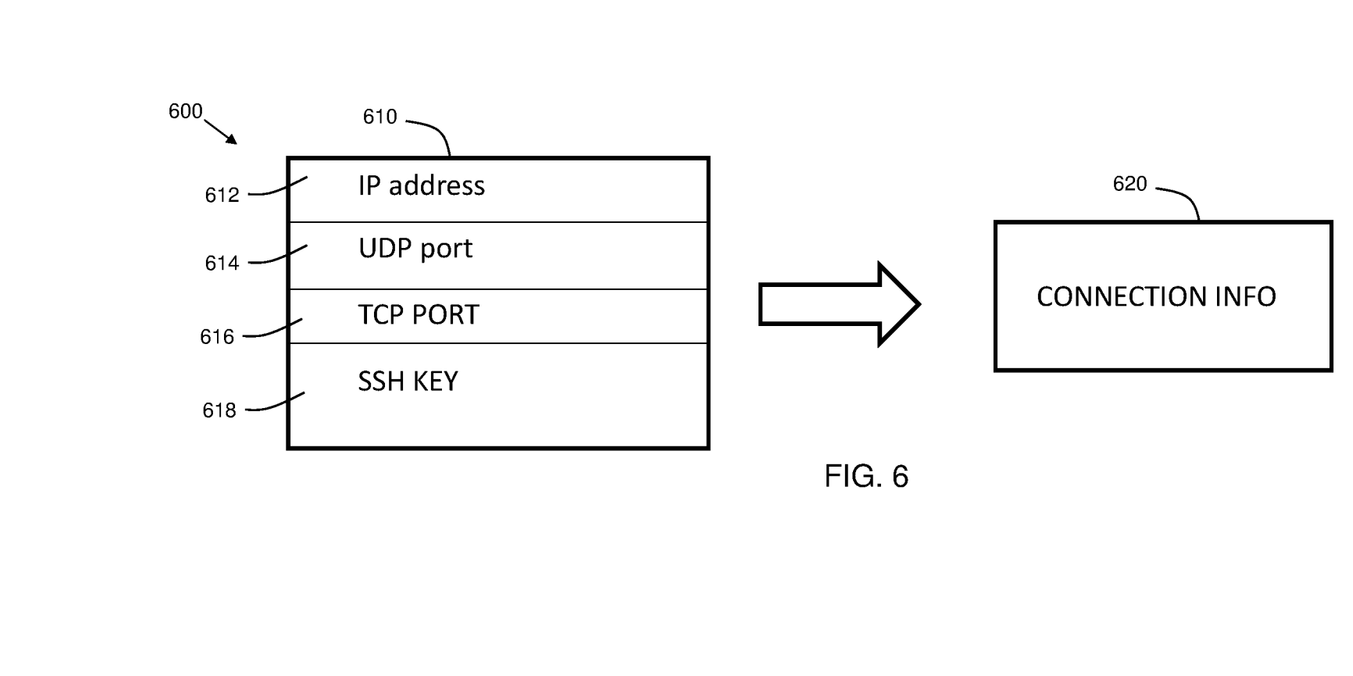
FIG. 6 shows an example of a variability point collapse.

FIG. 6 shows an example 600 of a variability point collapse. Some embodiments include performing a variability point collapse process. In the example, a template 610 has fields including: field 612 for IP address, field 614 for UDP port, field 616 for TCP port, and field 618 for SSH key. Since these all relate to a common topic-connections, they are merged into a single field 620 as "connection info." This simplifies the template, as well as genericizes the points of variability. In embodiments, the connection info field may accept input in a standardized markup language such as XML, yaml, or similar markup language, to define the variability points for their application.

Figure 7:
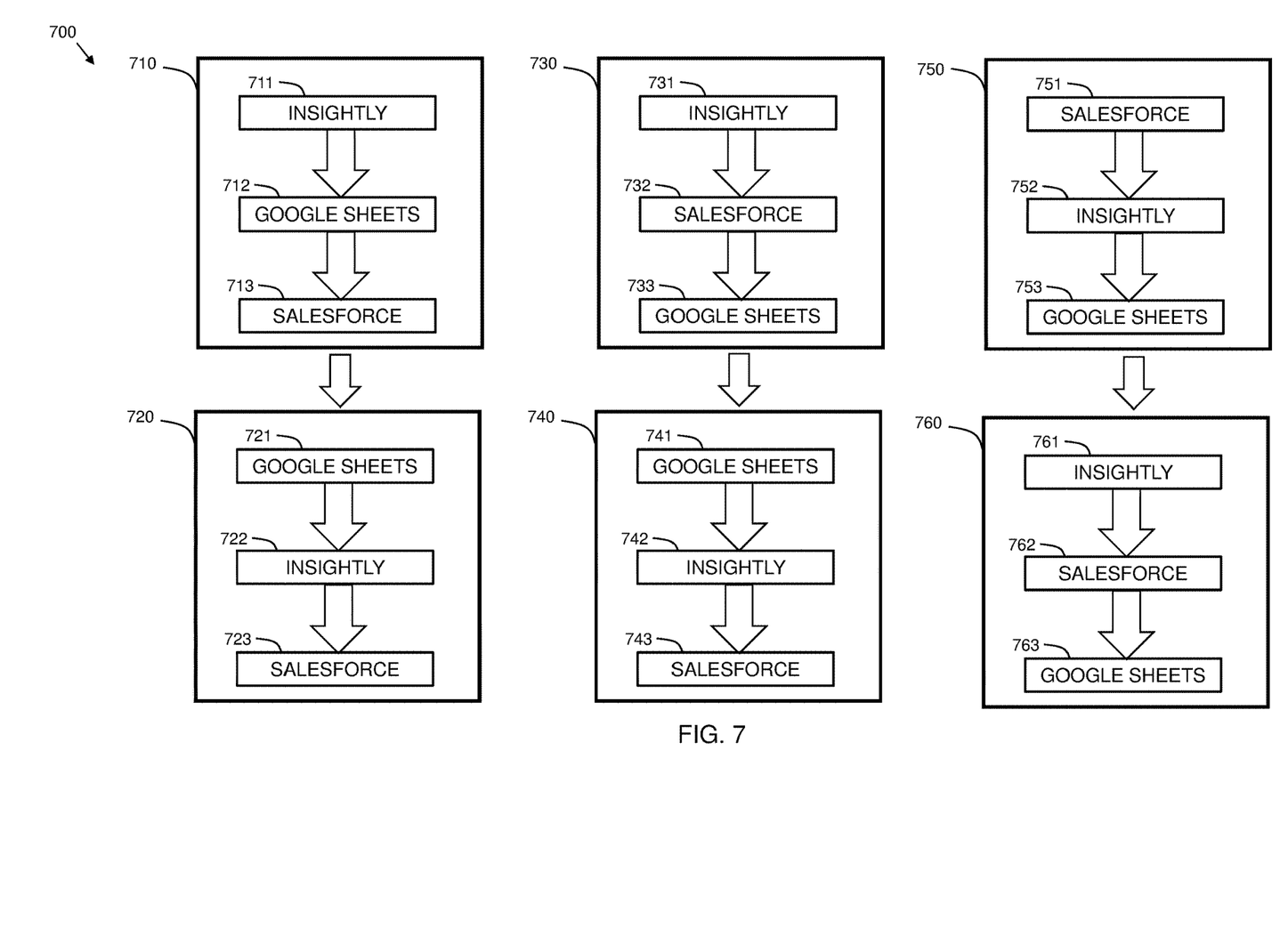
FIG. 7 illustrates examples of flow normalization.

FIG. 7 illustrates examples 700 of flow normalization. In some embodiments, normalizing a plurality of customer integration flows comprises reordering nodes of each customer integration flow alphabetically by name based on a criterion of node independence. Integration flow 710 includes node 711 which outputs data to Insightly, node 712 which outputs data to Google Sheets, and node 713 which outputs data to Salesforce. Since each of these nodes have satisfied the criterion of node independence (since they do not depend on input data from each other), they can be reordered in the normalized form as shown in normalized integration flow 720. Normalized flow 720 includes node 721 which outputs data to Google Sheets, node 722 which outputs data to Insightly, and node 723 which outputs data to Salesforce. The normalized integration flow 720 is functionally equivalent to the original integration flow 710.

Integration flow 730 includes node 731 which outputs data to Insightly, node 732 which outputs data to Salesforce, and node 733 which outputs data to Google Sheets. Since each of these nodes have satisfied the criterion of node independence (since they do not depend on input data from each other), they can be reordered in the normalized form as shown in normalized integration flow 740. Normalized flow 740 includes node 741 which outputs data to Google Sheets, node 742 which outputs data to Insightly, and node 743 which outputs data to Salesforce. The normalized integration flow 740 is functionally equivalent to the original integration flow 730. Furthermore, normalized integration flow 740 is identical to normalized integration flow 720. Thus, by normalizing the integration flow, comparison between flows becomes more efficient than if the corresponding unnormalized flows (710 and 720) were compared directly.

Integration flow 750 includes node 751 which receives data from Salesforce, node 752 which outputs data to Insightly, and node 753 which outputs data received from Salesforce by node 752 to Google Sheets. Thus, in this example, there is a data dependency between node 752 and node 753. Node 753 depends on data obtained by node 752. For the corresponding normalized flow 760, the order of the Salesforce node and the Google Sheets node is preserved. Thus, the flow of node 760 includes node 761 which outputs data to Insightly, node 762 which receives data from Salesforce, and node 763 which outputs data received from Salesforce to Google Sheets. Thus, even though alphabetically, Google Sheets precedes Salesforce, the original order of those nodes is maintained due to a node dependency. In embodiments, the integration flow template generation system 102 performs a dependency analysis prior to flow normalization to ensure that normalized flows behave identically to their unnormalized counterparts.

Figure 8:
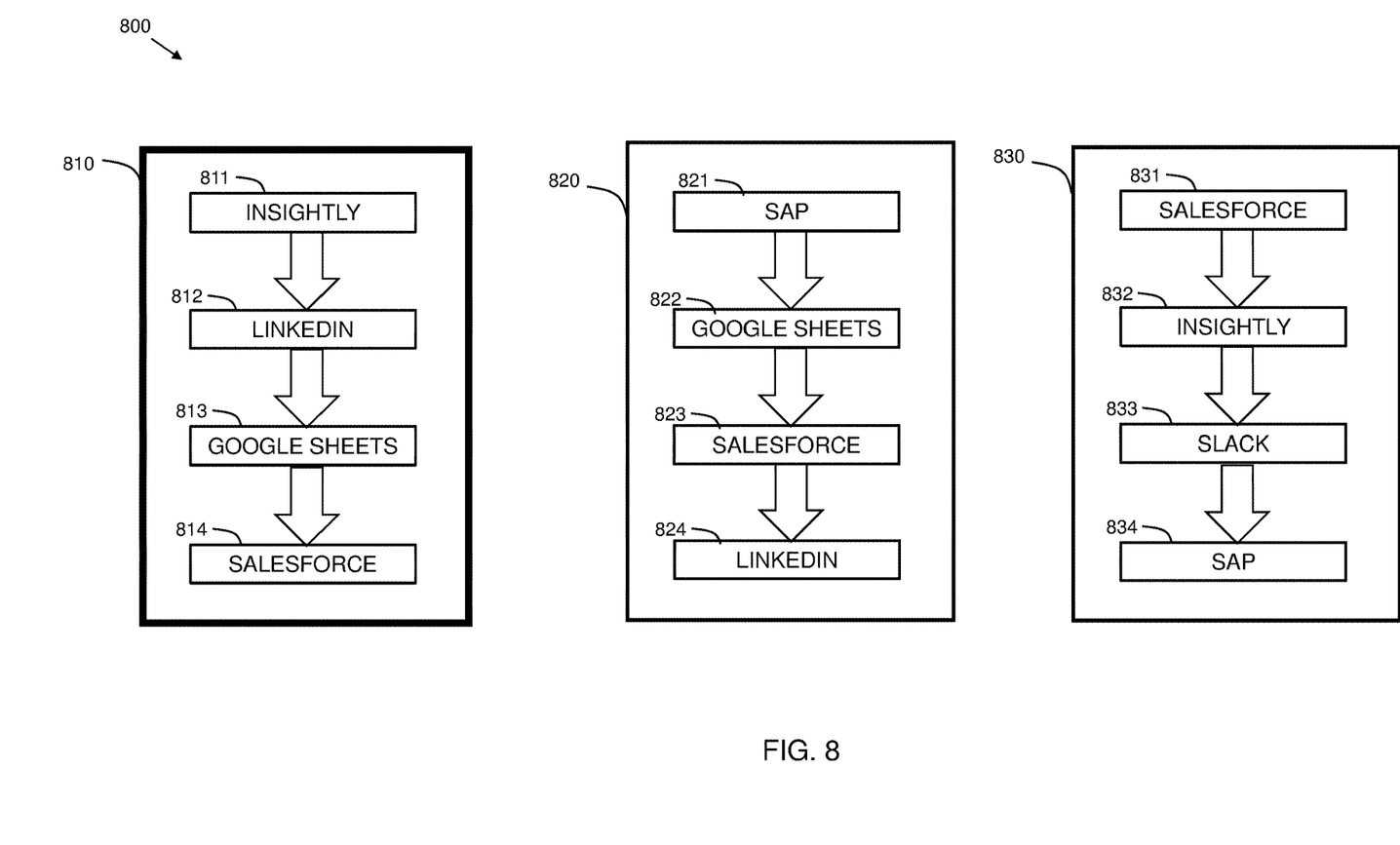
FIG. 8 illustrates examples of flow comparison.

FIG. 8 illustrates examples 800 of flow comparison (i.e., similarity scoring). As shown, base flow 810 is compared to flows 820 and 830. Base flow 810 has an order of nodes as: Insightly 811, followed by LinkedIn 812, followed by Google Sheets 813, and then Salesforce 814. Flow 820, has an order of nodes as: SAP 821, followed by Google Sheets 822, followed by Salesforce 823, and then LinkedIn 824. Since flow 820 includes the same nodes as the base flow 810, except for Insightly, a similarity score of "1" is assigned (whereas "0" would indicate identical flows).

Flow 830 has an order of Salesforce 831, followed by Insightly 832, followed by Slack 833, and then SAP 834. Since flow 830 includes the same nodes of the base flow 810, except for LinkedIn and Google sheets, a similarity score of "2" is assigned.

In this method of scoring, the lowest score indicates the highest similarity. Accordingly, flow 820, with the lower similarity score of "1", is more similar to the base flow 810 than is flow 830 having a similarity score of "2". In embodiments, a threshold may be established (e.g., the score must be X or less to be considered similar, where X is a number). Accordingly, with a score greater than X, a flow is not considered to be similar to that against which it is compared. The customer integration flows shown in FIG. 8 are exemplary, and other customer integration flows and node combinations are possible within the scope of embodiments of the present invention. Thus, in some embodiments, computing a similarity score for the base flow comprises adding a point for each node that differs between the base flow and a compared customer integration flow. It should be recognized that this method of computing a similarity score is exemplary, and other suitable computations are included within the scope of embodiments of the invention.

Figure 9:
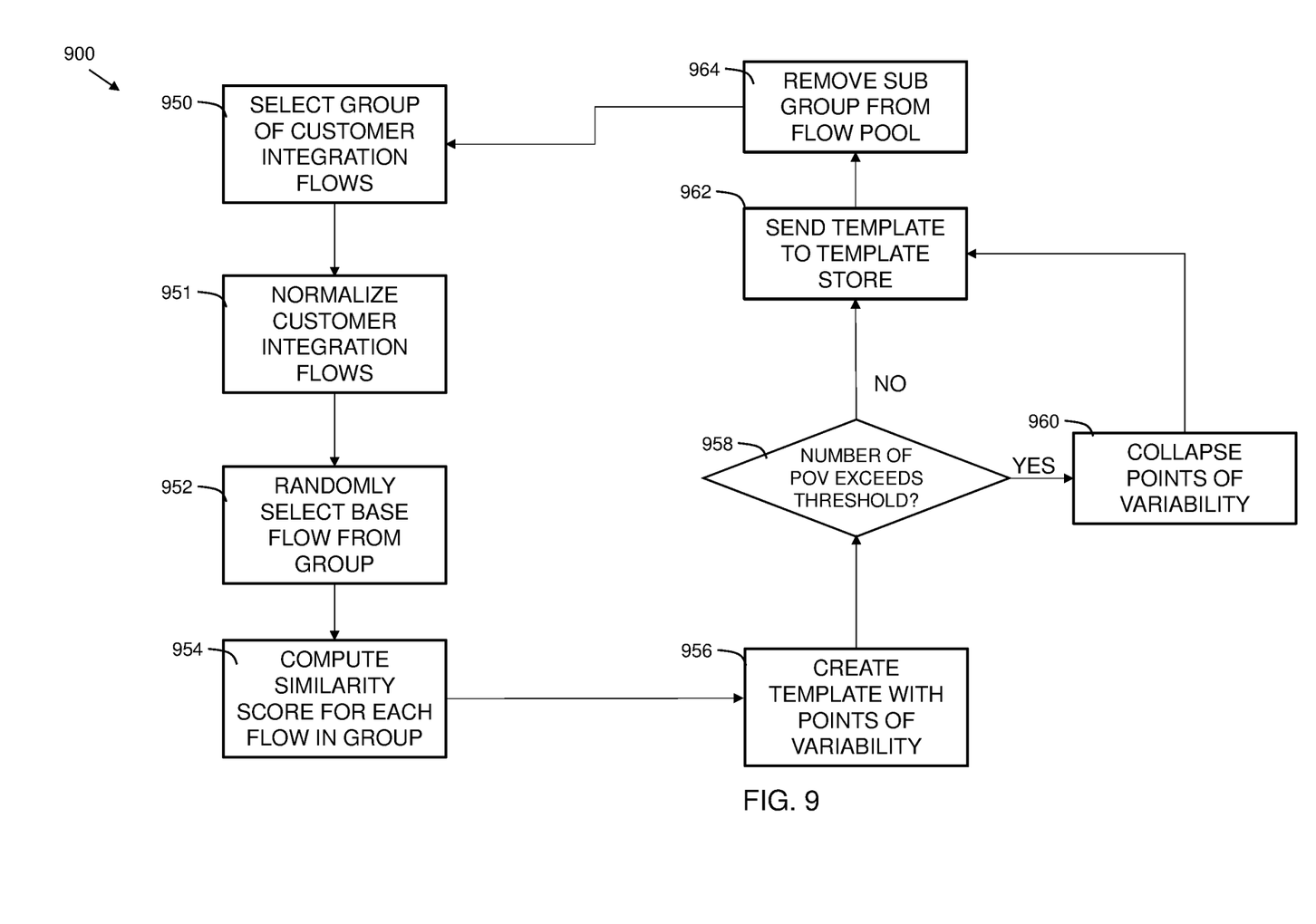
FIG. 9 is a flowchart showing process steps for embodiments of the present invention.

FIG. 9 is a flowchart 900 showing process steps for embodiments of the present invention. At 950, a group of customer integration flows is selected from a flow pool. The flow pool represents the entirety of customer integration flows. At 951, the group of customer integration flows are normalized to create a plurality of normalized customer integration flows. In some embodiments, normalizing a plurality of customer integration flows comprises normalizing at least five customer integration flows. In some embodiments, the plurality of customer integration flows is greater than or equal to three and less than or equal to ten customer integration flows. At 952, a base flow is randomly selected from a group of the plurality of normalized customer integration flows. At 954, a similarity score is computed for each flow in the group. The similarity score is a measure of similarity to the group of normalized customer integration flows. At 956, a template is created by identifying points of variability, such as depicted in FIG. 5. At 958, a check is made to determine if the number of points of variability (POV) exceeds a predetermined threshold. In embodiments, the threshold for the number of points of variability may range between three and ten, or other suitable range. If the number of POVs exceeds the threshold, then the points of variability in the base flow are collapsed at 960. At 962, the template is sent to a template store in response to the similarity score being within a predetermined threshold. At 964, the customer integration flows from the current group are removed from the flow pool. The process can then iterate by returning to process step 950, and selecting a new group from the reduced size flow pool.

Figure 10:
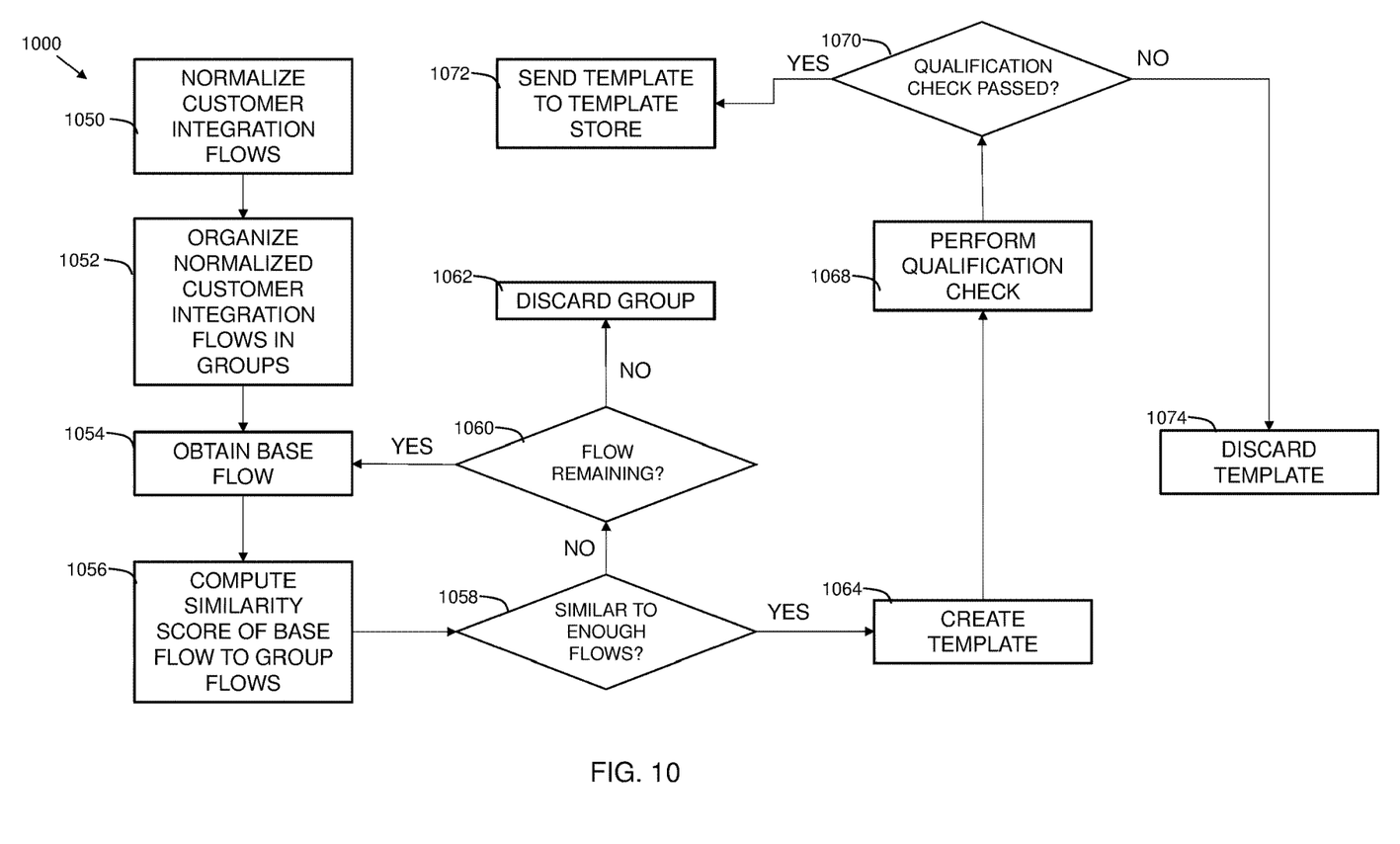
FIG. 10 is a flowchart showing process steps for additional embodiments of the present invention.

FIG. 10 is a flowchart 1000 showing process steps for additional embodiments of the present invention. At 1050, customer integration flows are normalized. At 1052, normalized customer integration flows are organized into groups. The groups may be formed based on the same starting node, the same node classification type, or other suitable criteria. At 1054, a base flow is obtained. At 1056, a similarity score is computed of the base flow to group flows.

At 1058, it is determined whether the base flow is similar to the group of flows based on the similarity score. Thus, embodiments send a template to a template store in response to determining an absence of existing templates with a similarity score being within a predetermined threshold. If, at 1058, the determination is no, at 1060, it is determined whether there is another flow remaining. If yes, the process processes back to block 1054. If no, the group is discarded at 1062. If, at 1058, the determination is yes, then at 1064, a template is created by creating points of variability as depicted in FIG. 5. The points of variability are collapsed if needed, as depicted in FIG. 6.

At 1068, a qualification check is performed. In embodiments, the qualification check can include performing a check for previously-generated existing templates in the template store with a similarity score within a predetermined threshold. In embodiments, the qualification check can include checking that the group size includes a sufficient number of different customers/users (e.g., more than five customers). In embodiments, the qualification check can include performing a check on the number of points of variability created during the create template step of 1064. In embodiments, if the number of points of variability exceeds a predetermined threshold, the qualification check fails. At 1070, the qualification check is performed. If, at 1070, the determination is that the qualification check passed, the process proceeds to block 1072, where the template is sent to the template store. Thus, embodiments include performing a check for existing templates in the template store with a similarity score within a predetermined threshold; and in which providing the selected customer integration flow to a template store occurs in response to determining an absence of existing templates with a similarity score being within a predetermined threshold (e.g., a similarity score of five or lower). If, at 1070, the determination is that the qualification check failed, the template is discarded at 1074.

Note: the terms Insightly, Salesforce, Google Sheets, SAP, Slack, and LinkedIn may be subject to trademark rights in various jurisdictions throughout the world and is/are used here only in reference to the products or services properly denominated by the mark(s) to the extent that such trademark rights may exist.

As can now be appreciated, disclosed embodiments provide improvements in the technical field of integration template generation. The integration flow templates are based on real-world customer integration flows, exploiting the principle that many customers have similar requirements and problems to solve in their applications. Thus, creating and sharing templates based on real-world usage can enable more rapid deployment of complex enterprise-level applications.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for generating integration flow templates, comprising:
   selecting a group of customer integration flows from a plurality of customer integration flows;
   normalizing the customer integration flows in the group to create a group of normalized customer integration flows;
   randomly selecting a normalized customer integration flow from the group of normalized customer integration flows as a base flow;
   creating a template from the base flow by creating one or more points of variability for fields containing different values between the base flow and one or more customer integration flows from the group of customer integration flows;
   performing a qualification check by determining whether the number of points of variability in the template exceed a predetermined points of variability threshold;
   performing a variability point collapse process if the number of points of variability in the template exceed the predetermined points of variability, wherein the variability point collapse process comprises merging fields in the template; and
   sending the template to a template store when the points of variability do not exceed the predetermined points of variability threshold;
   wherein the points of variability are user-defined values.

2. The computer-implemented method of claim 1, wherein normalizing the customer integration flows in the group comprises reordering nodes of each customer integration flow in the group alphabetically by name based on a node independence criterion.

3. The computer-implemented method of claim 1, wherein computing a similarity score for the base flow comprises adding a point for each node that differs between the base flow and a compared customer integration flow.

4. The computer-implemented method of claim 1, further comprising:
   computing a similarity score for the base flow, wherein the similarity score is a measure of similarity to the plurality of normalized customer integration flows; and
   wherein the qualification check further includes the similarity score being within a predetermined similarity score threshold.

5. The computer-implemented method of claim 1, wherein normalizing the customer integration flows in the group comprises normalizing at least five customer integration flows.

6. The computer-implemented method of claim 1, further comprising:
   performing a check for existing templates in the template store with a similarity score within a predetermined similarity score threshold; and
   wherein the qualification check further includes determining an absence of existing templates with a similarity score being within a predetermined threshold.

7. The computer-implemented method of claim 1, further comprising:
   removing the group of customer integration flows from the plurality of customer integration flows to form a reduced size plurality of customer integration flows, and
   generating one or more integration flow templates from the reduced size plurality of customer integration flows.

8. An electronic computation device comprising:
   a processor;
   a memory coupled to the processor, the memory containing instructions, that when executed by the processor, perform the steps of:
   selecting a group of customer integration flows from a plurality of customer integration flows;
   normalizing the customer integration flows in the group to create a group of normalized customer integration flows;
   randomly selecting a normalized customer integration flow from the group of normalized customer integration flows as a base flow;
   creating a template from the base flow by creating one or more points of variability for fields containing different values between the base flow and one or more customer integration flows from the group of customer integration flows;

performing a variability point collapse process if the number of points of variability in the template exceed the predetermined points of variability, wherein the variability point collapse process comprises merging fields in the template; and sending the template to a template store when the points of variability do not exceed the predetermined points of variability threshold;

wherein the points of variability are user-defined values.

9. The electronic computation device of claim 8, wherein the memory further comprises instructions, that when executed by the processor, perform the step of normalizing the customer integration flows in the group by reordering nodes of each customer integration flow in the group alphabetically by name based on a node independence criterion.

10. The electronic computation device of claim 8, wherein the memory further comprises instructions, that when executed by the processor, perform the step of computing a similarity score for the base flow comprises adding a point for each node that differs between the base flow and a compared customer integration flow.

11. The electronic computation device of claim 8, wherein the memory further comprises instructions, that when executed by the processor, perform the step of normalizing a plurality of customer integration flows by normalizing at least five customer integration flows.

12. The electronic computation device of claim 8, wherein the memory further comprises instructions, that when executed by the processor, perform the steps of:

computing a similarity score for the base flow, wherein the similarity score is a measure of similarity to the plurality of normalized customer integration flows; and wherein the qualification check further includes the similarity score being within a predetermined similarity score threshold.

13. The electronic computation device of claim 8, wherein the memory further comprises instructions, that when executed by the processor, perform a check for existing templates in the template store with a similarity score within a predetermined threshold; and wherein the qualification check further includes determining an absence of existing templates with a similarity score being within a predetermined similarity score threshold.

14. A computer program product for an electronic computation device comprising a computer readable storage medium having program instructions embodied therewith, the program instructions executable by a processor to cause the electronic computation device to perform the steps of:

selecting a group of customer integration flows from a plurality of customer integration flows;

normalizing the customer integration flows in the group to create a group of normalized customer integration flows;

randomly selecting a normalized customer integration flow from the group of normalized customer integration flows as a base flow;

creating a template from the base flow by creating one or more points of variability for fields containing different values between the base flow and one or more customer integration flows from the group of customer integration flows;

performing a variability point collapse process if the number of points of variability in the template exceed the predetermined points of variability, wherein the variability point collapse process comprises merging fields in the template; and sending the template to a template store when the points of variability do not exceed the predetermined points of variability threshold;

wherein the points of variability are user-defined values.

15. The computer program product of claim 14, wherein the computer readable storage medium includes program instructions executable by the processor to cause the electronic computation device to perform the step of normalizing the customer integration flows in the group by reordering nodes of each customer integration flow in the group alphabetically by name based on a node independence criterion.

16. The computer program product of claim 14, wherein the computer readable storage medium includes program instructions executable by the processor to cause the electronic computation device to send a template to a template store in response to determining an absence of existing templates with a similarity score being within a predetermined threshold.

17. The computer program product of claim 14, wherein the computer readable storage medium includes program instructions executable by the processor to cause the electronic computation device to perform normalization of a plurality of customer integration flows by normalizing a number of customer integration flows that is greater than or equal to three and less than or equal to ten customer integration flows.

18. The computer program product of claim 14, wherein the computer readable storage medium includes program instructions executable by the processor to cause the electronic computation device to perform the steps of removing the group of customer integration flows from the plurality of customer integration flows to form a reduced size plurality of customer integration flows, and generating one or more integration flow templates from the reduced size plurality of customer integration flows.

19. The computer-implemented method of claim 1, wherein the merging fields in the template comprises merging fields that relate to a particular topic.

20. The electronic computation device of claim 8, wherein the merging fields in the template comprises merging fields that relate to a particular topic.

* * * * *